United States Patent [19]

Wiechowski

[11] Patent Number: 4,555,886
[45] Date of Patent: Dec. 3, 1985

[54] METHOD OF MANUFACTURING AND ASSEMBLING A GRATING CONSTRUCTED OF RESIN BONDED FIBERS

[75] Inventor: Joseph W. Wiechowski, San Clemente, Calif.

[73] Assignee: Poly-Trusions, Inc., Santa Ana, Calif.

[21] Appl. No.: 568,298

[22] Filed: Jan. 5, 1984

[51] Int. Cl.⁴ ............................................. E04C 2/42
[52] U.S. Cl. .................................... 52/667; 52/177;
403/342; 156/309.6
[58] Field of Search ............... 52/180, 181, 666, 667, 52/177, 669; 403/346, 342; 119/28; 156/309.6

[56] References Cited

U.S. PATENT DOCUMENTS

| 469,519 | 2/1892 | Hale . | |
|---|---|---|---|
| 3,307,317 | 3/1967 | Lynn . | |
| 3,369,337 | 2/1968 | Butler | 52/669 X |
| 3,907,625 | 9/1975 | Vogelsanger | 156/309.6 X |
| 4,037,383 | 7/1977 | Diebold et al. | 52/177 X |
| 4,244,768 | 1/1981 | Wiechowski et al. | 52/180 X |
| 4,522,009 | 6/1985 | Fingerson | 52/667 |

FOREIGN PATENT DOCUMENTS 1230192 4/1971 United Kingdom ................. 52/667

Primary Examiner—Carl D. Friedman
Attorney, Agent, or Firm—Hubbard, Stetina & Brunda

[57] ABSTRACT

A resin bonded glass fiber grating constructed to mechanically interlock upon assembly to form a lightweight, high strength industrial grating, which may also be adhesively bonded or thermoplastically bonded, and which may also include a non-skid elastomer surface.

65 Claims, 16 Drawing Figures

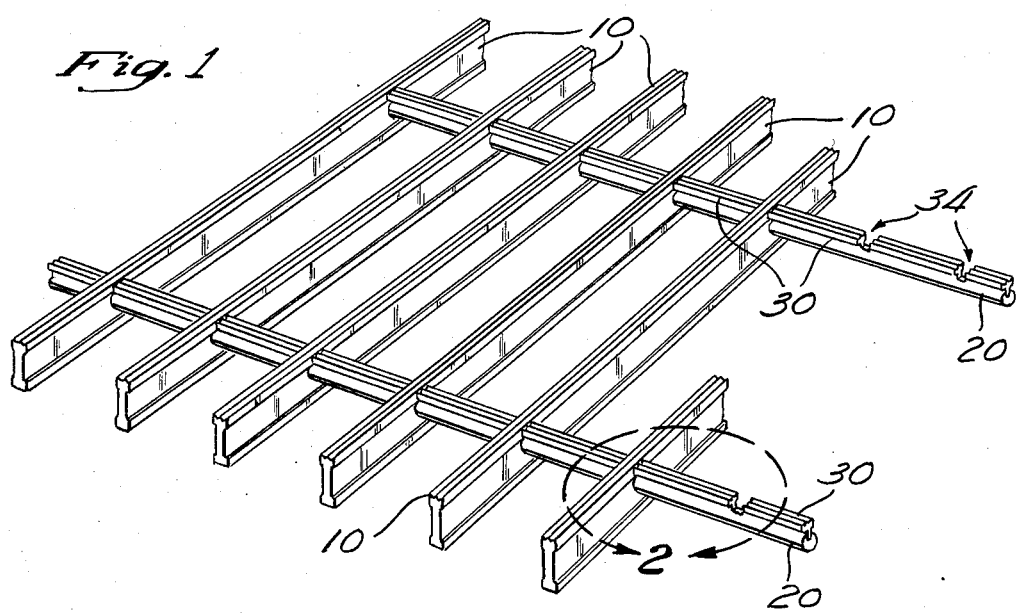
Fig. 1
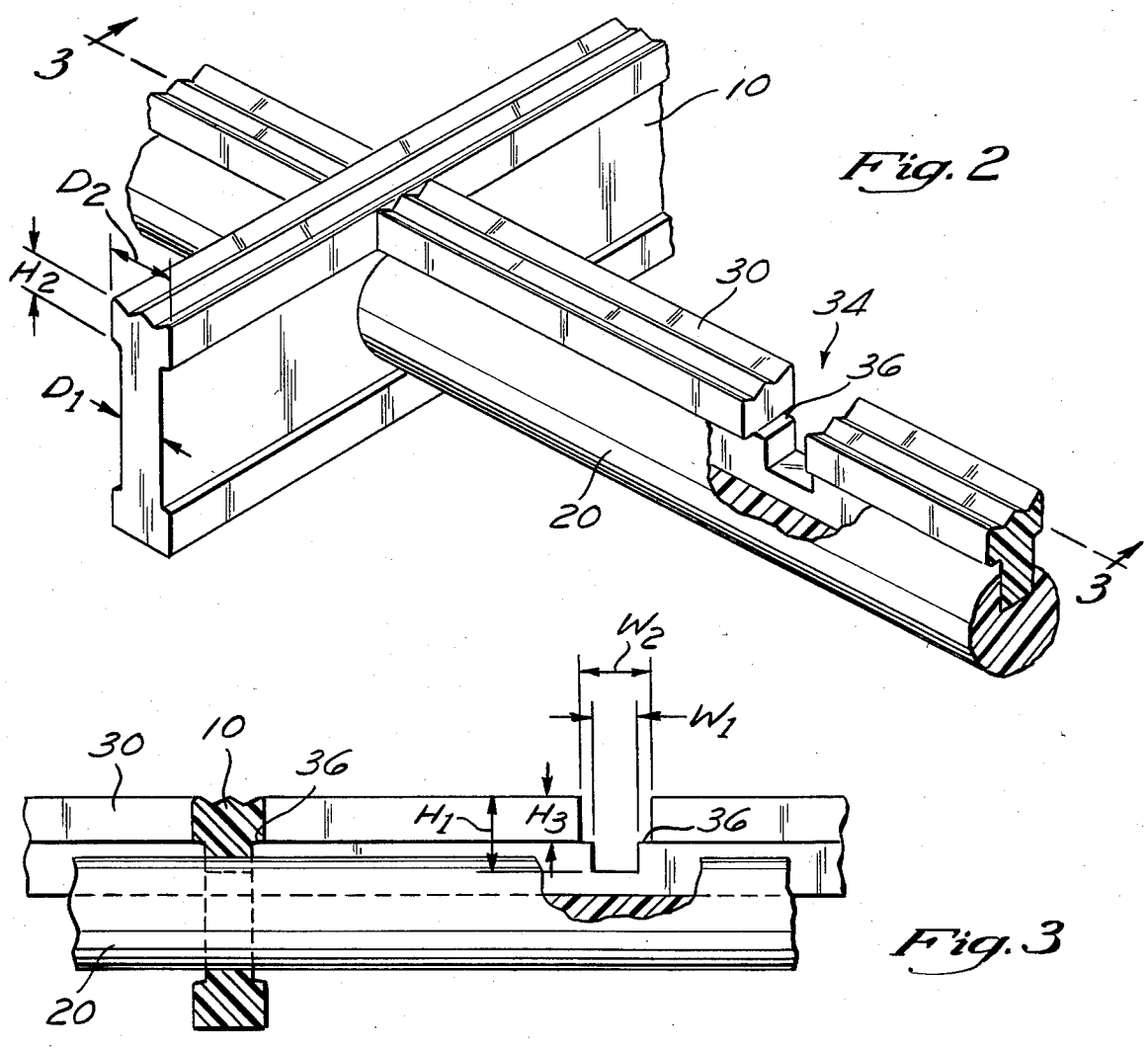
Fig. 2
Fig. 3

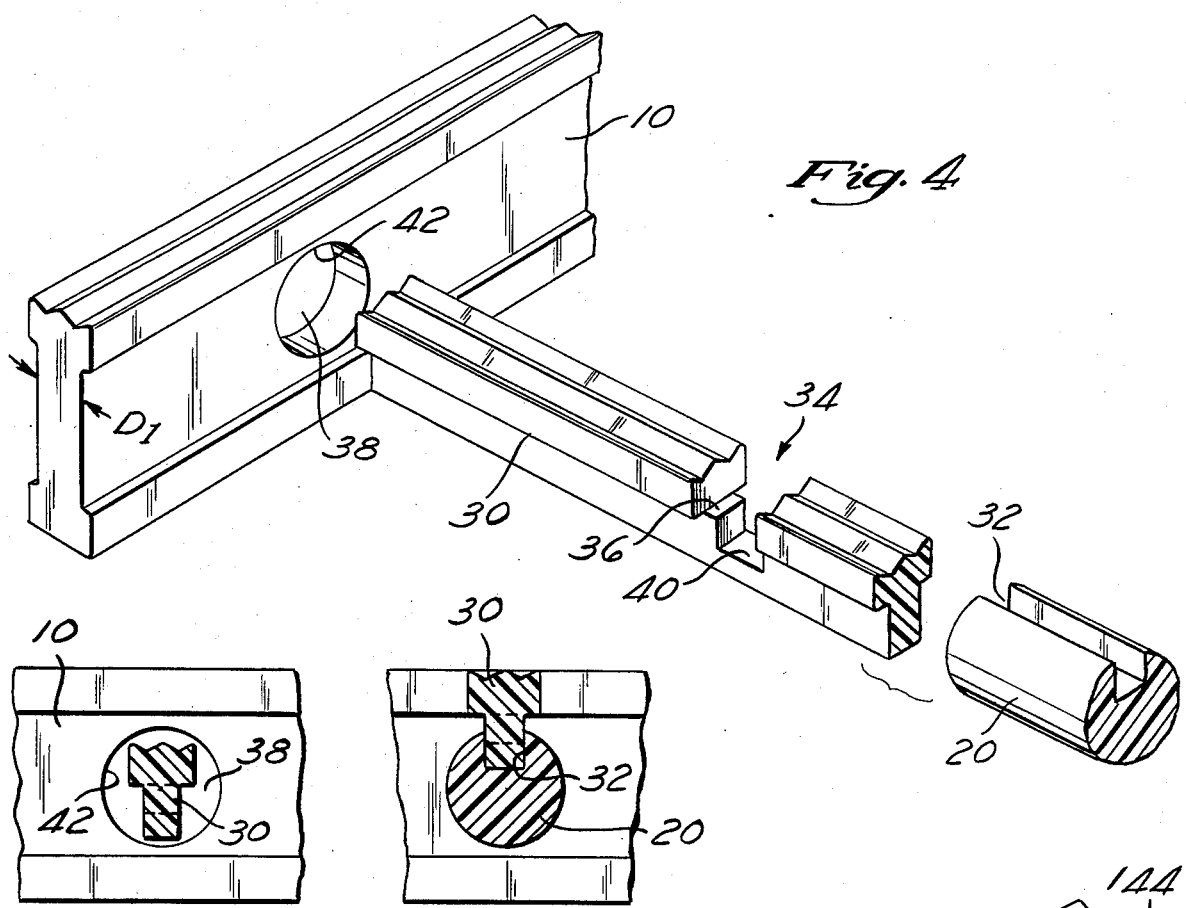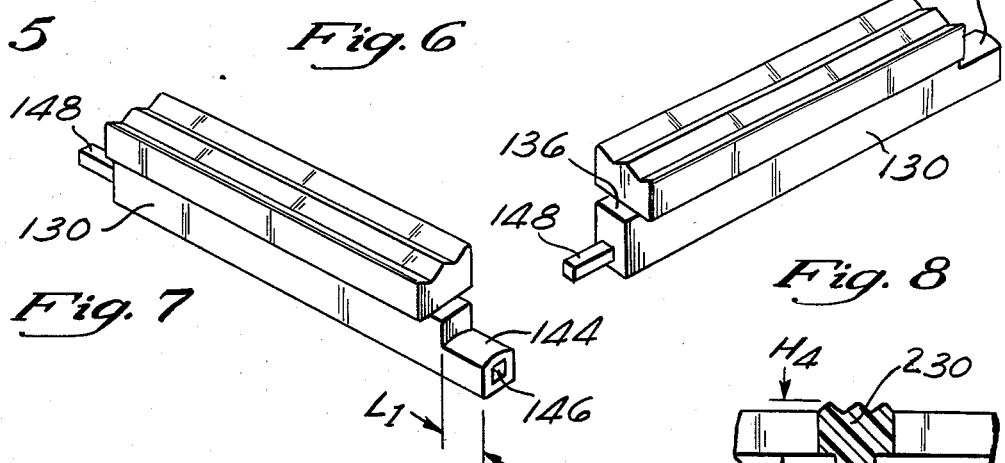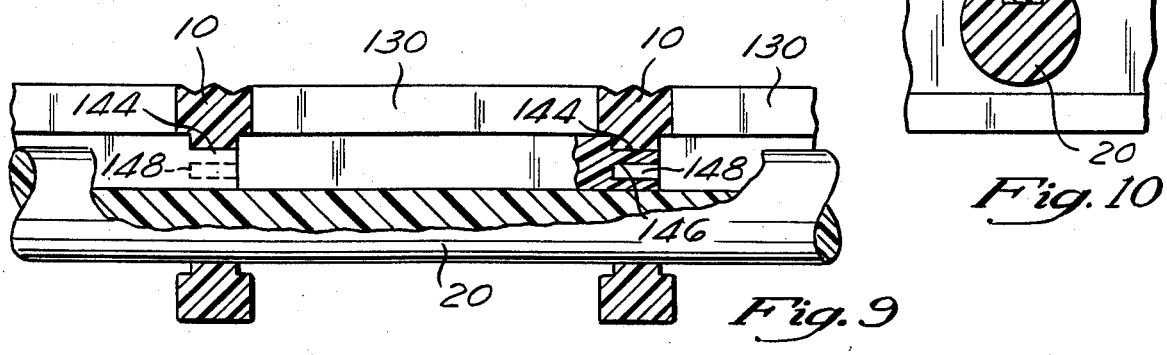

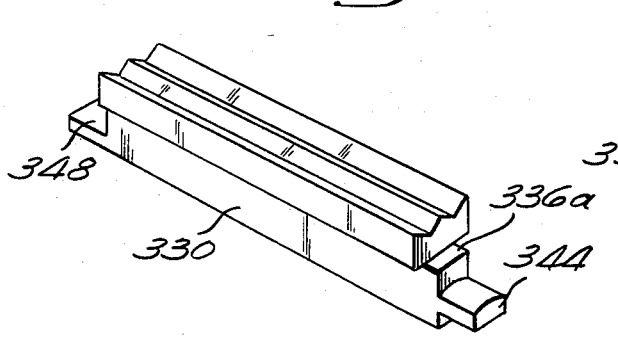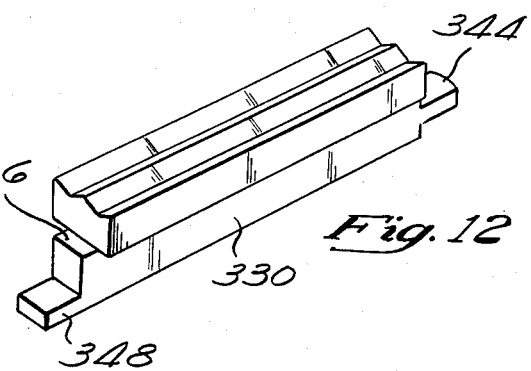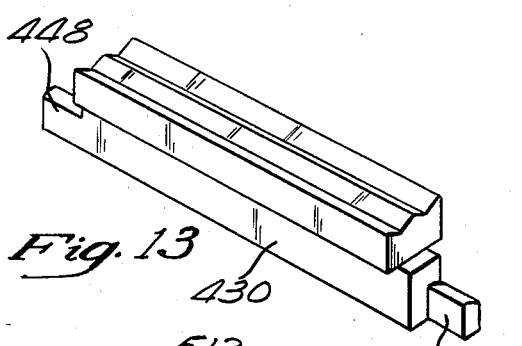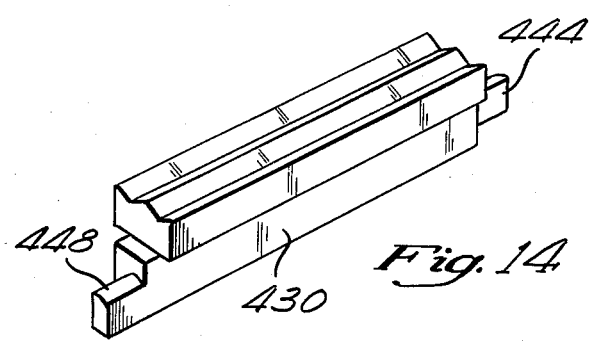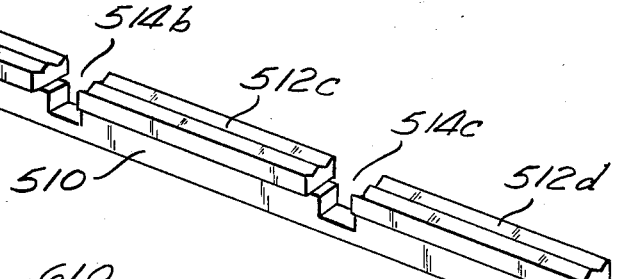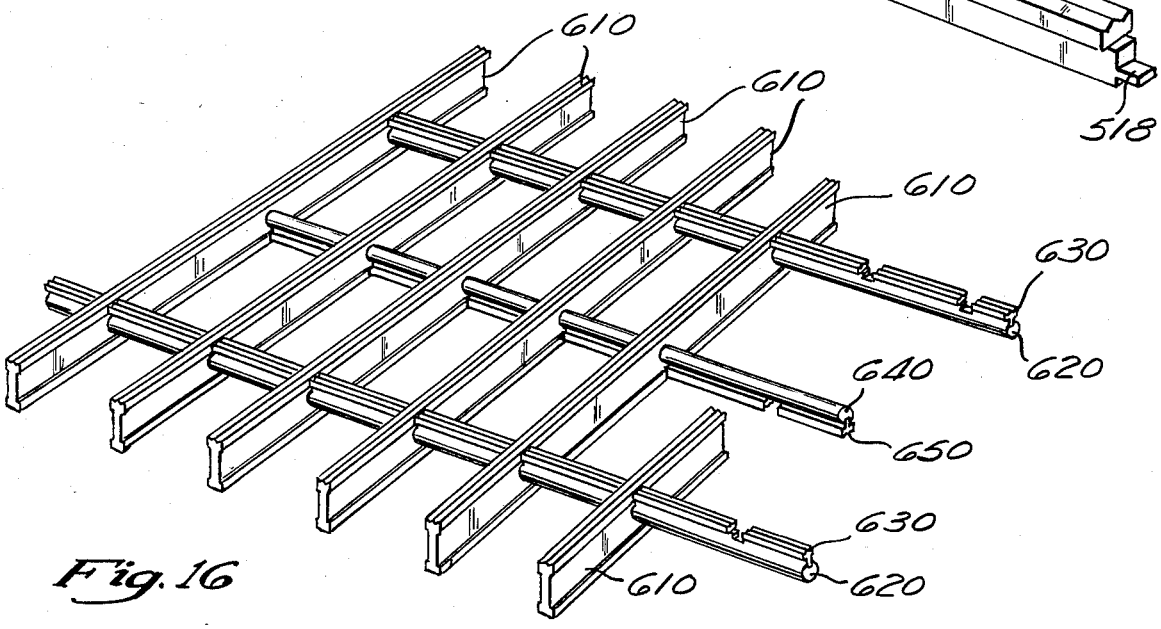

METHOD OF MANUFACTURING AND ASSEMBLING A GRATING CONSTRUCTED OF RESIN BONDED FIBERS

BACKGROUND OF THE INVENTION

This invention relates to industrial gratings, typically used in floor construction to provide covering for drain and cleaning channels, in animal production, food processing and other floor constructions. The grating constructions of this invention may also be used to support gas-liquid and solid-gas or solid-liquid contact media, e.g., scrubber saddles, rings and the like, in chemical process equipment. More particularly, this invention relates to an improvement in polyester bonded glassfiber gratings and to a method of manufacture and assembly.

It is common practice in industrial establishments to provide drain and cleaning channels in floors which permit scrubbing and cleaning of the floors and collection of cleaning solutions and spilled industrial solutions into an open drain channel. These drain channels are typically covered with a steel grating. The gratings, typically, are in a grid configuration. This type of construction permits the maintenance of clean working and processing conditions, easy access to drainage channels and, in general, an improved working area. Steel gratings are, of course, heavy and difficult to handle. Additionally, they are subject to corrosion by repetitive contact with water and air and by virtually all processing solutions. Steel gratings are, of course, electrically conductive, and in some environments present electrical shock hazards. Steel gratings are also cold and have limited flexibility and generally do not provide a pleasant walking surface. All of these and other disadvantages of steel gratings have been long recognized. Nevertheless, steel gratings are still in common use and a fully satisfactory alternative has not generally been available.

Various attempts have been made to provide plastic coated gratings or plastic gratings. For example, one approach is to lay alternating layers of fiberglass roving in a recess form and to pourcast polyester bonding resin over the fibers. Sometimes abrasive particles are bonded to the grating or may be included in the original casting of the grating in the obvious manner by placing the abrasive particles in the bottom of the form and then casting the resin over the fibers and the particles. This process produces only a marginally satisfactory product and is infected with a number of serious disadvantages. For example, gratings of this type have no drainage channel if the grating is laid flat on a floor, as is frequently the case in, for example, food processing plants. Additionally, the area of intersection of the portions of the gratings is an area of weakness because of the disruption of the fiber resin bonding and the asymmetrical disposition of the resins in this area. Gratings constructed according to this method are unnecessarily bulky and heavy and like the earlier devices, do not permit drainage.

Additionally, many of these gratings involve a complicated and time-consuming method of assembly and attachment of the various components to each other.

An improvement to the industrial grating has been disclosed in Wiechowski, et al., U.S. Pat. No. 4,244,768, wherein glass fiber grating components are manufactured utilizing pultrusion techniques, the main parallel grating elements being connected by round dowels running perpendicular to, and through, the main grating elements. Wiechowski, et al., also discloses individual grating elements spaced between and perpendicular to the main grating elements disposed in a slot formed in the connecting dowel.

Typically, the prior art must be held in the desired configuration while the various components are fastened or bonded together. This process requires the construction and use of forms or specialized equipment that are expensive and space-consuming. Further, the number of gratings that may be assembled at any given time is limited by the number of forms available and the space available to store the individual gratings in their respective forms while the bonding material cures properly. U.S. Pat. Nos. 469,519 and 469,520 disclose keybar locking mechanisms for holding the grating elements apart, but does not provide the additional grating surfaces or increased overall composite integrity of the grating.

These and other disadvantages are overcome according to this invention by the construction of a lightweight, high strength grating using the principles taught hereinafter.

SUMMARY OF THE INVENTION

The present invention provides a significantly improved industrial grating which effectively eliminates the need to construct such gratings of heavy, bulky, and non-corrosive resistant materials such as steel.

The industrial grating of a preferred form of the present invention is constructed of high-strength resin bonded fibers that have been manufactured by the pultrusion method into three primary elements, the main grating or I-beam, a cross-grating or cross-bar, and a round dowel. When assembled, these components provide a grating of high strength that has utilized a minimum amount of material and is, therefore, of minimum weight.

The novel configuration of the various components provide a system for assembling the grating in a highly efficient and economical manner, that automatically affixes the invention in a stable configuration as the components mechanically interlock upon assembly. This effectively eliminates the need to hold the components in the desired configuration with external forms or means of fixation while the various components are permanently bonded to each other.

In general, one facet of the invention comprises a method of manufacturing and assembling a grating constructed of resin-bonded fibers. The method includes the steps of drilling a series of registered aperatures in a plurality of I-beams or I-elements and providing a plurality of cross-bars. The cross-bars are notched at predetermined intervals, the notches having a first width and a second width, the first width being substantially the same diameter as the diameter of the upper portion of the I-element, and the second width being substantially the same diameter as the diameter of the narrow portion of the I-element. The first and second width form a shoulder in the notch. The cross-bars are inserted into the aperatures in the I-elements, the aperatures being slightly larger than the maximum diameter of the cross-bars. The notches are then aligned with the I-elements to provide spacing of the I-elements and are shifted to thereby cause the spacing and disposition of the I-elements in the notches and the juxtapositioning of the shoulder of each notch with the undersurface of the upper portion of the I-element. The cross-bars in the I-elements are then interlocked by extending a plurality of dowels through the holes in the I-elements. The dowels have substantially the same cross-sectional size as the diameter of the aperatures, but have an elongated slot therein. The slot is substantially the same width as the narrow portion of the cross-bar and is formed to receive the cross-bar, and thereby lock the cross-bar in the I-element. The locking of the cross-bar in the I-element works together to prevent rotation or turning of the dowel and the cross-bar relative to the aperature in the I-beams or I-elements.

The cross-bars may be formed integrally, that is of one piece in which the notches are formed, or may be formed of a number of cross-bar elements which are joined end-to-end, either mechanically, adhesively, or by fusion. In one preferred embodiment, the cross-bars are formed with an extension on one end which has a length substantially the same as the narrow diameter of the I-element, that is the thickness of the I-element through the web portion thereof. The cross-bar elements also have a protuberance on the other end. The extension has an aperture therein which receives the protuberance, thereby aligning and fitting the elements of the cross-bar together.

In an alternative embodiment, the cross-bar elements include other cooperatively mating extensions of a variety of configurations which prevent one element from rotating relative to the other. Examples of such mating extensions include flat, or relatively flat extensions which mate top to bottom or side to side, the top being on one element and the bottom on the other, or, in the side to side configuration, the left side being on one side and the right side being on the other.

The gratings comprise, in general, a plurality of I-beams disposed in parallel relation to one another. Each of the I-beams, typically, has a central web portion and may have an upper and large portion. The central web portion is vertically disposed, in the grating as used, and has a plurality of holes therethrough. The holes are in registry one with another in the respective I-beams, so that a dowel can be extended through aligned holes in each of the I-beams. A plurality of cross-bars extend, respectively, through the holes in the I-beams. Each cross-bar may have a shoulder portion which engage the underside of the upper enlarged portion of the I-beam through which it extends. A plurality of dowels, each having a groove formed longitudinally therein, extends through the holes in the I-beams, respectively, and receives a portion of the cross-bars in the groove, thereby locking the cross-bars into a fixed relation with the I-beams. The combination of I-beams, cross-bars, and dowels form a locked grating in which the dowel is prevented from turning in the holes of the I-beams by the cross-bars. In the preferred embodiment, the cross-bars are prevented from turning by engagement of a shoulder thereon with the underside of the upper enlarged portion of the I-beams.

The grating may comprise a plurality of I-beams so disposed in parallel relation one with another that the central web portion is vertically disposed and has a plurality of relatively registered holes therethrough, the I-beams presenting an upper surface for supporting traffic, typically foot traffic. A plurality of cross-bars composed of skid-resistant elastomer are provided. These skid-resistant elastomeric cross-bars have notches formed therein at spaced intervals and have an upper traffic supporting surface. The cross-bars extend through the holes in the web portions of the I-beams with the notches therein receiving the I-beams. These cross-bars are so disposed and constructed that the upper traffic supporting surface of the cross-bars extends above the upper surface of the I-beams. The cross-bars also have a lower key portion. A plurality of dowels, each dowel having a key slot extending longitudinally, also extend through the holes in the webs of the I-beams and receive, in a snug fit, the key portion of the cross-bar, which also extends through the same hole. The dowels extend through the holes in the web portion of the I-beams locking the cross-bars in the I-beams with the upper surfaces of the cross-bars extending above the upper surfaces of the I-beams, thereby presenting a non-skid elastomeric traffic supporting surface as the upper surface of the grating. Obviously, a similar surface could be presented on the bottom of the grating, but this would not usually be economical.

The cross-bars may, as previously described, be integral with notches formed therein, or may be formed of a multiplicity of cross-bar elements secured together by any convenient mechanical engagement, adhesive, or fusion means.

These cross-bar elements may, typically, be injection molded.

The elements of the grating may be made in whole or in part of thermoplastic materials. For example, the I-beam may include a portion of the fibers as thermoplastic fibers, e.g., nylon fibers. Likewise, the dowel may be made up entirely or partially of nylon fibers, as may be the cross-bar. This permits post-forming of the element, and also permits post-melt fusion of the components together.

An important feature of the invention is that the cross-bar may be composed of a rigid elastomer that may be elevated slightly above the normal plane of the I-beams, and provides a non-skid surface for the composite grating.

These and other advantages and features flow from this invention and will be apparent to those skilled in the art from the drawings referred to herein and from the following specification, all of which are exemplary and not limiting, the scope of the invention being defined only by the claims appended to the specification.

DETAILED DESCRIPTION OF THE DRAWINGS

FIG. 1 is a perspective view showing a section of grating constructed according to the principles of this invention.

FIG. 2 is an enlarged perspective about line 2 of FIG. 1.

FIG. 3 is a cross-sectional view about line 3—3 of FIG. 2.

FIG. 4 is an exploded view of the three primary components of the grating.

FIG. 5 is a cross-sectional view of the cross-bar and a partial side view of an I-beam.

FIG. 6 is a cross-sectional view of the cross-bar and the round dowel in place in the I-beam in an aperture in an I-beam.

FIG. 7 and FIG. 8 are perspective views of individually constructed cross-bars.

FIG. 9 is a cross-sectional view of the grating showing the interlocking nature of the individual cross-bars with themselves and the I-beam.

FIG. 10 is an alternative embodiment of the grating, corresponding to FIG. 6, in which the cross-bar provides a non-skid grating surface.

FIGS. 11 and 12 are perspective views of, respectively, the opposite mating ends of an alternative form of the cross-bar elements of this invention.

FIGS. 13 and 14 are perspective views of, respectively, the opposite mating ends of another alternative form of the cross-bar elements of this invention.

FIG. 15 is a modified form of cross-bar segment.

FIG. 16 is another embodiment of the grating.

DETAILED DESCRIPTION OF THE INVENTION

The invention is disclosed by means of non-limiting exemplary depictions. Reference is made first to FIG. 1 which shows a portion of a typical grating or I-beams 10 constructed according to this invention. The typical grating includes a plurality of vertical elements arranged in a parallel configuration connected together in a grating construction by a combination of a plurality of round dowel-like elements, or dowels 20, and cross-bar elements, or cross-bars 30. The vertical elements 10 may be perfectly rectangular in configuration, but in the preferred embodiment are generally in the configuration of an "I" and, for that reason, are referred to merely for convenience hereinafter as I-beams 10. Likewise, the cross-bar elements 30 are also generally in the configuration of a "T". As used herein, the term "I-beam" and "cross-bar" include elements not formed in an I or T, respectively, configuration. Also, the elongate round elements are referred to as dowels 20 for convenience.

All the I-beams 10 are initially constructed according to the pultrusion method of forming resin bonded fiberglass elements; the cross-bars 30 and dowels 20 may be similarly formed, or formed by other methods, such as injection molding.

According to the pultrusion method, fibers are intimately mixed with a bonding resin and pulled through a curing zone on a continuous basis to form the final product. Generally speaking, glass fibers are used and that is the general context of this disclosure. However, other fibers, including metal strands, may be included to impart particular characteristics. Graphite fibers and polyester fibers may, for example, be incorporated into the pultrusion produced I-beam 10 or dowel 20 in particular instances.

According to this invention, fusible or non-fusible fibers may be pultruded into desired configurations using thermoplastic or thermosetting resins. Examplary fiber-resin combinations include Nylon (polyamide) or polyester fibers with polyester or epoxy resin; and glass or graphite fibers with polyester, polyamide or epoxy resin. The resin may be incorporated by coating the fibers with liquid resin or by intermixing meltable and non-meltable fibers, e.g. nylon, polyester, polypropylene, or other thermoplastic fibers mixed with glass or graphite fibers.

Polyester and epoxy organic resins are the preferred bonding materials for forming a rigid element by bonding the fibers together. Polyester bonding of glass fibers, as a fabrication technique, is well-known. While less commonly used, epoxy is also well-known as a bonding material for forming glass fiber reinforced particles. The technique for formulations and applications of these resins to produce various types of structures is well-known in the art and abundant descriptive information is available. Methods for forming elongate glass fiber reinforced structures generally of the type described herein are also well-known. The pultrusion method, for example, is quite well-known and various techniques for using this method in the fabrication of elongate articles has been described. See, for example, U.S. Pat. Nos. 3,556,888 and 3,674,601. The method has also been described in various technical publications; see, for example, Modern Plastics Encyclopedia, for the past several years, e.g. 1973–1976, wherein several articles on this technique have appeared. Fibers, bonding resins, techniques and equipment generally suitable for producing the elements used in the manufacture of the gratings of this invention are widely described in the literature. See, e.g., Plastics Engineering Handbook, 4th Edition, Frados, Van Nostrand-Reinhold Company, New York, 1976.

Briefly, in the pultrusion technique, the desired number of strands or rovings of fiber of the desired type are pulled from continuous reels through a reservoir of the bonding resin and over strippers, rollers and dies to initimately intermix the resin with the fibers and to remove the excess resin. The fibers, intimately coated with resin, are then progressively combined together and ultimately pulled through a form of the size and shape of the ultimate element to be manufactured. As the combination of resin and fibers emerges from the form, it is in substantially the ultimate shape of the element. The combined resin-fiber configuration is then pulled through a curing zone where the resin is heated by radiant heat, circulating heat or some other heating technique. Microwave heating, with or without x-ray, gamma ray or electron radiation, is also used to cure the resin in a relatively short zone. The cured resin is then pulled into a cooling zone and is ultimately cut into the desired length or rolled, as may be desired.

The resin may be either fully set or only partially set, or, in the case of thermoplastic binder, simply heated and allowed to cool in the final configuration.

In addition to the conventional combined resin-fiber configuration as described above, the resultant product generally termed as thermoset plastic, the end product can be formed of thermoplastic fibers which melt at low temperature. The use of thermoplastic fibers, which results in a plastic generally called thermoplastic, has the advantage of being reheated after formation that will cause the thermoplastic to bond to adjacent thermoplastic or thermoset plastic. Re-forming by reheating to particular configurations is also possible with such products.

In a typical manufacturing operation, the grating shown in FIG. 1 can be manufactured by forming a plurality of I-beams 10 which are then positioned in parallel relationship, and drilling holes substantially equal in diameter to the diameter of the dowels 20 in registry through the I-beams. The dowels 20, manufactured by the same method, are formed with a slot 32 (better seen in FIG. 4) running lengthwise along the dowel 20, and having a diameter in depth of approximately one-third the diameter of the dowel 20. The cross-bars 30, typically, but not necessarily similarly manufactured, are formed in various configurations as discussed below. The combination of the particularly formed cross-bars 30, and the slot 32 in the dowel 20, provide a method of assembly that results in a grating that is mechanically interlocked, and, therefore, in a stable configuration. According to this feature of the invention, once the various components of the invention have been assembled, the invention exists in the ultimate desired configuration. Because of the interlocking nature of the components, the invention is self-supporting, and the various components may then be bonded using known bonding formulations, e.g. epoxy or other resin, such as described in U.S. Pat. No. 4,244,768. If composed of one or more elements manufactured from thermoplastic, the elements may be heated to cause bonding between the components.

Very importantly, since the components are self-locking, there is no need to support the grating while the adhesives or the heat-sensitive bonding progresses.

In many applications it is desirable, and sometimes required by law, to have contrasting colors at various points. For example, it is highly desirable, and, in some types of operations legally required, to have a contrasting color at the edge of each step or at the end of a particular section. In such instances, the special elements that are used to cap the end of the structure at the end of the assembly process, can be made of a contrasting color, for example, bright orange or bright yellow to indicate the edge of the steps or the edge of the grating. Other individual elements may, of course, be colored differently according to the pigment included in the polyester bonding resin, as is common practice in the pultrusion technique.

In a preferred construction, the cross-bar 30 is notched at predetermined intervals perpendicular to its length, as can be seen in FIG. 2 and FIG. 3. The notch 34 is formed such that the smallest width W1 is essentially the same as the minimum or web diameter D1 of the I-beam 10, and the upper portion of the notch 34 has a width W2 that is essentially the same as the upper or tread diameter D2 of the I-beam 10, and the height H3 of the upper portion of the notch 34 also being the same dimensions as the height H2 of the upper portion of the I-beam 10. The shoulder 36 that is thus formed by these notches and the surfaces of the upper portion of the I-beam 10 are such that the shoulder 36 of the cross-bar 30 and the bottom surface of the upper tread portion of I-beam 10 are contiguous and interchanging when the cross-bar is assembled in position. The height H3 of the notch 34 in the cross-bar 30 is such that once the cross-bar 30 is in place, the upper surface of the cross-bar 30 and the upper surface of the I-beam 10 are in the same plane. This configurational relationship between the upper portion of the I-beam 10 and the notch 34 of the cross-bar 30 that provides an important interlocking feature of the invention can more clearly be seen in the left-hand portion of FIG. 3 where the I-beam 10 is seen in cross-section.

The I-beam 10 is drilled with holes 38 along its longitudinal axis and at predetermined intervals as shown in FIG. 4, the diameter of which is the same as the dowel 20. The dowel 20 is formed with a key slot 32 that runs along its length, extending approximately one-third of the way into the dowel 20, and having a width essentially the same as the diameter of the lower or key portion of the cross-bar 30.

In assembling the present invention, the I-beams 10 are placed in a parallel configuration on a flat surface, and spaced apart approximately the same distance as the distance between the notches 34 on the cross-bar 30. As shown in FIG. 5, the cross-bar 10 is then placed through the aligned holes 38 of the I-beams 10, then gently lifted vertically until the shoulder 36 of the notch 34 rests on the lower surface of the upper portion of the I-beam 10, and the bottom surface 40 of the notch 34 in the cross-bar 30 rests on the inside surface 42 of the hole 38 drilled in the I-beam 10. The bottom surface 40 of the notch 34 in the I-beam 10 may be alternately formed with a rounded surface having the same radius as the radius of the hole 38 drilled in the I-beam 10, thereby allowing juxtapositioning of the two surfaces 40 and 42. With the cross-bar 30 now in position, the key slotted dowel 20 is now placed through the same holes 38 such that the bottom of the cross-bar 30 rests in the slot 32 of the dowel 20, as seen in FIG. 6. As can be seen in FIG. 3 and FIG. 6, this mechanically locks the cross-bar 30 into position, which then locks the I-beams 10 in the predetermined configuration. Because of the novel configuration of the notch 34 in the cross-bar 30, the parallel surfaces of the shoulder 36 and the underneath portion of the upper portion of the I-beam 10 prevent the cross-bar 30 from being rotated in any direction, thereby providing stability to that component. Further, because of the configuration of the slot 32 in the dowel 20 and the disposition of the lower portion of the cross-bar in the dowel 20, the dowel 20 also is locked in such a position as to prevent any rotational movement.

As can be seen in FIGS. 2, 3, and 6, this novel configuration of the elements and assembly results in a grating that is not only mechanically self-locking, but has a series of juxtaposed surfaces that resist movement of the individual components, thereby increasing the stability and integrity of the entire structure, and, importantly, provides added tread support in the grating.

Once the components have been assembled as described above, adhesives can now be applied to the juxtaposed surfaces of the various components. Since the structure does not require any external fixation until the adhesive has cured, the grating may be moved to an appropriate storage factility until the adhesive has properly cured.

The relationship of the heights (H) and the widths (W) and depths (D) are important. Generally, the height of the upper enlarged portion of the I-beam, H2, (see FIG. 2) and the corresponding height of the upper enlarged portion of the cross-bar, H3, (see FIG. 3) are the same and the depth of the total notch, H1, (see FIG. 3) is such that the upper surface of the I-beams and cross-bars present a generally flat tread surface, all tread portions lying generally in the same plane. This greatly increases the comfort and safety of the grating. In one embodiment, the cross-bar tread is raised, however (see FIG. 10). The width of the upper tread portions of the I-beam, D2, (see FIG. 2) and the width of the upper portion of the notch in the cross-bar, W2, (see FIG. 3) are generally equal, W2 being just wide enough to snuggly receive D2, and the width of the lower portion of the notch in the cross-bar, W1, (see FIG. 3) is just wide enough to snuggly receive D1 (see FIG. 2), the width of the lower or central web portion of the I-beam. This notch and over-hang arrangement, wherein the shoulder 36 is formed in the notch and the overhang under D2 is formed on the I-beam, the shoulder engaging into the overhand, is a very important structural feature of the invention. This structural relationship, and the method of forming the grating which includes this relationship, fixes the angular orientation of the components. The I-beam is fixed vertically (in normal use) and prevented from twisting or bending side-to-side, and is fixed perpendicularly to the axis of the dowel and cross-bar, thus assuring rigidity in the overall shape of the grating. The tendency of the grating to form a parallelogram without right angle corners, which was a problem, is avoided. Rotation of the dowel in the appertures and twisting of the cross-bars from the vertical is prevented by this shoulder—overhang interaction.

In another form of the invention, depicted in FIGS. 7 and 8, the I-beam 10 is formed as described above using pultrusion methodology, and subsequently drilled with holes 38 at predetermined intervals, all as described above. The cross-bars 130 in this embodiment, however, are manufactured individually using a conventional injection mold process. The shoulders 136 that are formed of the same dimensions as the upper portion of the I-beam 10, such that the undersurface of the upper portion of the I-beam 10 rests on the shoulder 136 of the cross-bar 130, as described above. One end of the cross-bar 130 is formed with an extension 144 having a length L1 equal to the narrow diameter D1 of the I-beam 10, and having its upper surface rounded with a radius equal to the radius of the hole 38 that has been drilled in the I-beam 10. This extension 144 is further formed with a hole 146, preferably square, positioned to accept an equally dimensioned protrusion 148 from an adjoining cross-bar 130. The extension 144 and protrusion 148 on either end of the cross-bar 130, that can be seen in FIGS. 7 and 8, comprise a male/female interlocking system.

The dowel 20 is formed as described above or of thermoplastic material, with a slot 32 having a width of the same dimension as the width of the narrowest portion of the cross-bar 130.

Assembly may be accomplished by a variety of methods. For example, the first I-beam 10 can be placed into position followed by placing all the dowels 20 through the appropriate holes 38 in the first I-beam 10, then alternately placing the cross-bar elements 130 in place, followed by the next I-beam 10, until the desired dimension of the grating is reached. As can be seen in FIG. 9, as each successive cross-bar element 130 is placed into position following the interposing I-beam 10, the male/female interlocking system of the cross-bar elements 130 is engaged. Further, the combination of the slotted dowel 20, the male/female interlocking system, and the shoulder 136 of the cross-bar element 130 that is positioned under the upper portion of the I-beam 10, creates the mechanically-locked configuration that is now self-supporting. The grating may now be adhesively bonded, or otherwise secured, as described above, or adhesive or other securing means such as pins, may be applied as the grating is being assembled.

Alternatively, the assembly may be heated to permit the cross-bar elements 130, when made of thermoplastic, to bond to the I-beams 10 and/or the dowel 20. The dowel may, of course, be of thermoplastic and will, in such case, bond to the cross-bar elements and/or I-beams.

The components may be formed as indicated above, the cross-bar 130 being composed of thermoplastic. In this embodiment, once assembly has been completed and the positive mechanical lock has been achieved, the entire grating may be heated sufficiently to fuse the thermoplastic both to itself, therefore making the cross-bars 130 essentially a continuous homogeneous structure, and also bonding the thermoplastic cross-bar 130 to the I-beams 10 and the dowel 20. Additionally, an adhesive may also be applied, the resulting structure having a positive mechaical lock, a fused bond, and an adhesive bond.

In the construction shown FIG. 10 the components are formed essentially as described above, except the cross-bar 230 is composed of a rigid elastomer, such as, for example, rubber, neoprene, or any of the synthetic rubbers, that provides a non-skid surface. Further, the cross-bar 230 is constructed such that the height H4 of the cross-bar is greater than the height H2 of the upper portion of the I-beam 10, resulting in the upper surface of the cross-bar 230 extending above the plane of the upper surface of the I-beams 10. The rigid elastomer non-skid cross-bar 230 is otherwise formed as described, and, upon assembly, create, in conjunction with the slotted dowel 20, a positive mechanically-interlocked system. Appropriate adhesive bonding or mechanical fastening of the components can now be accomplished.

FIGS. 11 and 12 show an alternate embodiment in which the cross-bar element 330 is like element 130, except that the mating structure at the respective ends are relative flat elements 344 and 348 which engage in the aperture of the I-beam and, preferably, are bonded to form an integral cross-bar. The shoulders 336 and 336a performs the function performed by shoulder 136 in element 130.

FIGS. 13 and 14 show a further alternate embodiment in which the cross-bar element 430 is like element 130, except that the mating structure at the respective ends are vertical flat elements 444 and 448 which engage in the aperture of the I-beam and, preferably, are bonded to form an integral cross-bar. The shoulder 336 performs the function performed by shoulder 136 in element 130.

FIG. 15 depicts a cross-bar element in which a number of notches are formed. Such an element may be compression or injection molded in segments of two, three, four or more, typically up to 10 to 50 notch segments, depending upon the capacity of the molding machine. The segments then are bonded or fused or otherwise secured together to form the total elongate cross-bar. The cross-bar segment 510 includes a plurality of tread portions 512a, 512b, 512c, and 512d, separated by notches 514a, 514b, 514c, all as previously described and having the same relationship in terms of width, depth, and height, as previously discussed. Interlocking portions 516 and 518, shown for exemplary purposes only, as a pair of mating flats, are also provided at the ends to permit bonding of the segments in the apertures of the I-beams to form the elongate cross-bar.

It will be understood that the invention, in which the cross-bar tread portions comprise skid-resistant material and extend above the plane of the tread portions of the I-beams may be used with the skid-resistant portions facing up, or the I-beam may simply be inverted in structure, with tread portions of the I-beam being on the top and tread portions of the cross-bars being on the bottom. This spaces the entire grating above a surface which will permit more complete drainage and will also give a shock absorbing characteristic.

FIG. 16 is an alternative embodiment to that shown in FIG. 1. In the embodiment of FIG. 16, the I-beams 610 are separated by a plurality of combinations of dowels 620 and cross-bars 630 with the cross-bar including a resilient or otherwise skid-resistant upper tread surface which extends above the upper surface of the I-beams with alternate dowel and cross-bar combinations 640 and 650, the dowel 640 securing the cross-bar 650 with the cross-bar extending downwardly and also extending below the bottom surface of the I-beams. In this configuration, the entire grating is supported above the surface by the downwardly extending alternate portions of the cross-bar. The cross-bars may, obviously, be alternating or may simply be spaced at any desired interval.

In the preferred embodiment of the grating shown in FIG. 16, a resilient skid-resistant surface is provided on the cross-bars which extends, alternately, above and below the grating, giving a skid-resistant surface effect to the grating, and also resiliently supporting the grating above a surface, making walking more comfortable, safer, and easier, and also, preferably, including the shoulder and overhang interlocking arrangement which provides the grate rigidity available with this invention.

Gratings constructed as described are particularly advantageous where shock resistance is important, such as where heavy objects are dropped on the floor. In the handling of beer kegs, for example, these kegs are frequently dropped and damaged during handling. Not only are the worker's protected from discomfort and injury from walking on hard surfaces, materials and containers are protected from damage upon being dropped, rolled or moved about.

It will be understood that the principles of this invention are applicable to many products and product lines and variations of products and product lines which are not specifically discussed. For example, alternate construction of the grating of this invention may include capping members or elements for the ends of the I-beams 10, or the dowels 20, or both, thereby protecting these ends and providing a more rigid and stronger construction of the grating. Further, the principles of this invention may be used to produce nose pieces for grating stairs which are partly colored and/or include abrasive or gripping surfaces. In addition to the composition of the various elements as described above, the invention contemplates a variety of different materials and combinations of these materials among the various elements to achieve particular purposes. Further, the top surfaces of the I-beams 10, as well as the cross-bars, can be smooth or notched, as shown, or include abrasives to provide a non-skid or gripping surface.

The preceding disclosure is exemplary, only, and not limiting. Many variations in technique and composition are possible and well within the scope of the invention. Variations in the distances between the placement of the I-beams 10, or the cross-bars 30, as well as variations in the width or length of the grating, are only a few variations which are within the scope of the invention as defined in the claims.

In particular, it is contemplated that the I-beams and/or the dowels and/or the cross-bars and cross-bar elements be fabricated by a modified pultrusion method in which some or all of the fibers are meltable or thermoplastic, and that some or all of the bonding internally of an element be accomplished by melting or partially melting some or all of such meltable fibers to cause bonding internally of the component and adhesive bonding of one component to another. For example, if the cross-bar is made of bonded thermoplastic or meltable fibers, the entire bonding of the grating can be accomplished by heating the assembled grating. Of course, this bonding can be supplemented by the use of other adhesives, such as those described earlier.

It is also within the scope of this invention to make the dowels and cross-bars of resilient material, e.g., molded rubber, neoprene, or other resilient thermoplastic materials, thus providing a flexible, vibration resistant grating for environments in which equipment is subject to constant vibration, such as an oil drilling platforms, marine vessels, railroad tank cars, etc. Rigid gratings tend to fracture at joints under such conditions, whereas the presently considered embodiment of the invention will absorb and flex with the vibration and will conform to non-flat configurations and withstand the rigors such extreme environments can impose upon structures and equipment.

INDUSTRIAL APPLICATION

This invention is useful in making gratings for agricultural and industrial use and in general construction.

What is claimed is:

1. A method of manufacturing a grating comprising the steps of:
   (a) forming longitudinally elongate I-beams having a plurality of apertures therein, the respecive apertures in said I-beams being in registry, the I-beams being comprised of an upper portion of a greater width and a lower portion of lesser width under the upper portion, the greater and lesser width forming an overhang under the upper portion and the adjacent lower portion;
   (b) forming notched cross-bars having upper and lower portions, each having a plurality of notches, the notches therein being in registry, each notch having an upper notch portion and a lower notch portion, a shoulder being formed between the upper and lower notch portions;
   (c) forming dowels having a diameter substantially the diameter of the apertures in the I-beams and having a key slot formed longitudinally therein substantially equal to the width of the lower portion of the cross-bars;
   (d) inserting a plurality of notched cross-bars through a plurality of respectively registered apertures in a plurality of said I-beams to interengage the shoulders on the cross-bars into the overhang on the I-beams, thereby fixing a plurality of I-beams longitudinally side by side in generally parallel relationship one to another; and
   (e) securing dowels substantially perpendicular to the length and height of the I-beams through the apertures therethrough, the key slot in the dowels receiving the lower portions of the cross-bars, the interengaging shoulder and overhang cooperating with the key slotted dowel and bottom of the cross-bars to prevent turning the cross-bars or rotation of the dowel in the apertures and to prevent tilting of the I-beams from the perpendicular to the dowels.

2. The method of claim 1, wherein step (b) comprises forming a plurality of cross-bar elements and securing them together to form the cross-bar.

3. The method of claim 1, wherein step (b) comprises injection molding a plurality of thermoplastic cross-bar elements and securing them together to form the cross-bar.

4. The method of claim 1, wherein step (b) comprises inserting a plurality of cross-bar elements through a plurality of respectively registered apertures in a plurality of said I-beams to interengage the shoulders on the cross-bar elements into the overhang on the I-beams, thereby fixing a plurality of I-beams longitudinally side by side in generally parallel relationship one to another and bonding the elements together to form an integral cross-bar.

5. The method of claim 4, wherein the cross-bar elements are composed of a meltable polymeric material and wherein the step of bonding the elements together comprises heating them to cause them to partially melt and fuse one to another.

6. The method of claim 4, wherein the cross-bar elements are composed of a resilient non-skid material.

7. The method of claim 6, wherein the cross-bar elements are so constructed and configured as, when assembled, to extend above the plane of the upper surface of the I-beams to thereby form a skid-resistant grating surface.

8. The method of claim 2, wherein the cross-bar elements have on the respective elements thereof mating structures which, when the cross-bar is formed, interengage to prevent one element from rotating relative to the adjacent interengaged element.

9. The method of claim 8, wherein the mating structures comprise male and female interengaging structure.

10. The method of claim 8, wherein the mating structures comprise interengaging flat surfaces.

11. The method of claim 8, wherein step (b) comprises injection molding a plurality of thermoplastic cross-bar elements and securing them together to form the cross-bar.

12. The method of claim 8, wherein step (b) comprises inserting a plurality of cross-bar elements through a plurality of respectively registered apertures in a plurality of said I-beams to interengage the shoulders on the cross-bar elements into the overhang on the I-beams, thereby fixing a plurality of I-beams longitudinally side by side in generally parallel relationship one to another and bonding the elements together to form an integral cross-bar.

13. The method of claim 12, wherein the cross-bar elements are composed of a meltable polymeric material and wherein the step of bonding the elements together comprises heating them to cause them to partially melt and fuse one to another.

14. The method of claim 8, wherein the cross-bar elements are composed of a resilient non-skid material.

15. The method of claim 14, wherein the cross-bar elements are so constructed and configured as, when assembled, to extend above the plane of the upper surface of the I-beams to thereby form a skid-resistant grating surface.

16. A grating comprising, in combination:
(a) a plurality of elongate I-beams each having a plurality of apertures therein, the respective apertures in said I-beams being in registry, the I-beams being comprised of an upper portion of a greater width and a lower portion of lesser width under the upper portion, the greater and lesser width forming an overhang under the upper portion and the adjacent lower portion;
(b) a plurality of notched cross-bars having an upper portion and a lower portions, said cross-bars having a plurality of notches, the notches therein being in registry, each notch having an upper notch portion and a lower notch portion forming a shoulder therebetween;
(c) a plurality of dowels having a diameter substantially the diameter of the apertures in the I-beams and having a key slot formed longitudinally therein substantially equal to that width of the lower portion of the cross-bars;
(d) said notched cross-bars extending through a plurality of respectively registered apertures in a plurality of said I-beams, the shoulders thereon engaging in the overhang of the I-beams, fixing said I-beams longitudinally side by side in generally parallel relationship one to another; and
(e) said dowels secured substantially perpendicular to the length and height of the I-beams through the apertures therethrough, the key slot in the dowels receiving the lower portions of the cross-bars, the interengaging shoulder and overhang and the keyed dowel cooperating to prevent rotation of the dowel in the apertures and tilting of the I-beams.

17. The grating of claim 16, wherein the cross-bar comprises a plurality of cross-bar elements secured together to form the cross-bar.

18. The grating of claim 16, wherein the cross-bar comprises injection molded cross-bar elements and secured together to form the cross-bar.

19. The grating of claim 16, wherein the cross-bars comprise a plurality of cross-bar elements extending into a plurality of respectively registered apertures in a plurality of said I-beams to interengage the shoulders on the cross-bar elements into the overhang on the I-beams, thereby fixing a plurality of I-beams longitudinally side by side in generally parallel relationship one to another.

20. The grating of claim 19, wherein the cross-bar elements are composed of a meltable polymeric material bonded together by having been heated to cause them to partially melt and fuse one to another.

21. The grating of claim 19, wherein the cross-bar elements include skid-resistant material on the upper surface thereof.

22. The grating of claim 21, wherein the cross-bar elements are so constructed and configured as, when assembled, to extend above the plane of the tops of the I-beams.

23. The grating of claim 17, wherein the cross-bar elements have on the respective elements thereof mating structures which, when the cross-bar is formed, interengage to prevent one element from rotating relative to the adjacent interengaged element.

24. The grating of claim 23, wherein the mating structures comprise male and female interengaging structure.

25. The grating of claim 23, wherein the mating structures comprise interengaging flat surfaces.

26. The grating of claim 23, wherein the cross-bars comprise injection molded thermoplastic cross-bar elements secured together to form the cross-bar.

27. The grating of claim 23, wherein the cross-bars comprise a plurality of cross-bar elements extending into a plurality of respectively registered apertures in a plurality of said I-beams to interengage the shoulders on the cross-bar elements into the overhang on the I-beams, thereby fixing a plurality of I-beams longitudinally side by side in generally parallel relationship one to another bonded together to form an integral cross-bar.

28. The grating of claim 27, wherein the cross-bar elements are composed of a meltable polymeric material bonded together by having been heated to cause them to partially melt and fuse one to another.

29. The grating of claim 23, wherein the cross-bar elements are composed of a resilient non-skid material and are so constructed and configured as, when assembled, to extend above the plane of the upper surface of the I-beams to thereby form a skid-resistant grating surface.

30. A grating comprising, in combination:

(a) a plurality of elongate I-beams, each having a plurality of apertures therein, the respective apertures in said I-beams being in registry, the I-beams being comprised of an upper portion of a greater width and a lower portion of lesser width under the upper portion forming an overhang between the upper and lower portions of the I-beam;

(b) a plurality of notched cross-bars having a skid-resistant upper portion and a lower portion, having a plurality of notches, the notches therein being in registry, (c) a plurality of dowels having a diameter substantially the diameter of the apertures in the I-beams and having a key slot formed longitudinally therein substantially equal to the width of the lower portion of the cross-bars;

(d) said notched cross-bars extending through a plurality of respectively registered apertures in a plurality of said I-beams, each notch having an upper notch portion and a lower notch portion, said upper and lower notch portions forming a shoulder therebetween, the upper skid-resistant portion extending above the plane of the upper surfaces of the I-beams, fixing said I-beams longitudinally side by side in generally parallel relationship one to another; and (e) said dowels secured substantially perpendicular to the length and height of the I-beams through the apertures therethrough, the key slot in the dowels receiving the lower portions of the cross-bars, the skid resistant upper portions of the cross-bars forming a skid-resistant surface on the grating, the shoulder and overhang cooperating with the dowel key slot to prevent rotation of the dowel.

31. The grating of claim 30, wherein the cross-bar comprises a plurality of cross-bar elements secured together to form the cross-bar.

32. The grating of claim 30, wherein the cross-bar comprises injection molded cross-bar elements and secured together to form the cross-bar.

33. The grating of claim 30, wherein the cross-bars comprise a plurality of cross-bar elements extending into a plurality of respectively registered apertures in a plurality of said I-beams to interengage the shoulders on the cross-bar elements into the overhang on the I-beams, thereby fixing a plurality of I-beams longitudinally side by side in generally parallel relationship one to another.

34. The grating of claim 33, wherein the cross-bar elements are composed of a meltable polymeric material bonded together by having been heated to cause them to partially melt and fuse one to another.

35. The grating of claim 33, wherein the cross-bar elements include square male and female portions for securing the elements together and preventing relative rotation thereof.

36. The grating of claim 35, wherein the cross-bar elements are so constructed and configured as, when assembled, maintain the I-beams vertical in use and prevent rotation of the dowels in the apertures.

37. The grating of claim 31, wherein the cross-bar elements have on the respective elements thereof mating structures which, when the cross-bar is formed, interengage to prevent one element from rotating relative to the adjacent interengaged element.

38. The grating of claim 37, wherein the mating structures comprise male and female interengaging structure.

39. The grating of claim 37, wherein the mating structures comprise interengaging flat surfaces.

40. The grating of claim 37, wherein the cross-bars comprise injection molded thermoplastic cross-bar elements secured together to form the cross-bar.

41. The grating of claim 37, wherein the cross-bars comprise a plurality of cross-bar elements extending into a plurality of respectively registered apertures in a plurality of said I-beams to interengage the shoulders on the cross-bar elements into the overhang on the I-beams, thereby fixing a plurality of I-beams longitudinally side by side in generally parallel relationship one to another bonded together to form an integral cross-bar.

42. The grating of claim 41, wherein the cross-bar elements are composed of a meltable polymeric material bonded together by having been heated to cause them to partially melt and fuse one to another.

43. The grating of claim 37, wherein the cross-bar elements are composed of a resilient non-skid material.

44. The grating of claim 43, wherein the cross-bar elements are so constructed and configured as, when assembled, to extend above the plane of the upper surface of the I-beams to thereby form a skid-resistant grating surface.

45. A grating comprising, in combination:
(a) a plurality of elongate I-beams, each having a plurality of apertures therein, the respective apertures in said I-beams being in registry, the I-beams being comprised of an upper portion of a greater width and a lower portion of lesser width under the upper portion, each notch having an upper notch portion and a lower notch portion, said upper and lower notch portions forming a shoulder therebetween;

(b) a plurality of notched cross-bars having a skid-resistant upper portion and a lower portion, said upper and lower notch portions forming a shoulder therebetween, having a plurality of notches, the notches therein being in registry, the cross-bars comprising a plurality of cross-car elements bonded together and to the I-beams to form an integral structure;

(c) a plurality of dowels having a diameter substantially the diameter of the apertures in the I-beams and having a key slot formed longitudinally therein substantially equal to the width of the lower portion of the cross-bars.

(d) said notched cross-bars extending through a plurality of respectively registered apertures in a plurality of said I-beams, the upper skid-resistant portion extending above the plane of the upper surfaces of the I-beams, fixing said I-beams longitudinally side by side in generally parallel relationship one to another; and (e) said dowels secured substantially perpendicular to the length and height of the I-beams through the apertures therethrough, the key slot in the dowels receiving the lower portions of the cross-bars, the shoulder and overhang cooperating with the dowel key slot to prevent rotation of the dowel.

46. The grating of claim 45, wherein the cross-bar comprises injection molded cross-bar elements and secured together to form the cross-bar.

47. The grating of claim 45, wherein the cross-bar elements are composed of a meltable polymeric material bonded together by having been heated to cause them to partially melt and fuse one to another.

48. The grating of claim 47, wherein the cross-bar elements include square male and female portions for securing the elements together and preventing relative rotation thereof.

49. The grating of claim 48, wherein the cross-bar elements are so constructed and configured as, when assembled, maintain the I-beams vertical in use and prevent rotation of the dowels in the apertures.

50. The grating of claim 45, wherein the cross-bar elements have on the respective elements thereof mating structures which, when the cross-bar is formed, interengage to prevent one element from rotating relative to the adjacent interengaged element.

51. The grating of claim 50, wherein the mating structures comprise male and female interengaging structure.

52. The grating of claim 50, wherein the mating structures comprise interengaging flat surfaces.

53. The grating of claim 50, wherein the cross-bars comprise injection molded thermoplastic cross-bar elements secured together to form the cross-bar.

54. The grating of claim 45, wherein the cross-bar comprises a plurality of cross-bar elements extending into a plurality of respectively registered apertures in a plurality of said I-beams to interengage the shoulders on the cross-bar elements into the overhang on the I-beams, thereby fixing a plurality of I-beams longitudinally side by side in generally parallel relationship one to another bonded together to form an integral cross-bar.

55. The grating of claim 54, wherein the cross-bar elements are composed of a resilient non-skid material.

56. The grating of claim 55, wherein the cross-bar elements are so constructed and configured as, when assembled, to extend above the plane of the upper surface of the I-beams to thereby form a skid resistant grating surface.

57. A grating comprising, in combination:
(a) a plurality of elongate I-beams each having a plurality of apertures therein, the respective apertures in said I-beams being a registry, the I-beams being comprised of a first portion of a greater width and a second portion of lesser width, the greater and lesser width forming an overhang between the first portion and the adjacent second portion;
(b) a plurality of notched cross-bars having a first portion and a second portion, said cross-bars having a plurality of notches, the notches therein being in registry, each notch having a first notch portion and a second notch portion forming a shoulder therebetween;
(c) a plurality of dowels having a diameter substantially the diameter of the apertures in the I-beams and having a key slot formed longitudinally therein substantially equal to the width of the second portion of the cross-bars;
(d) some of said notched cross-bars, facing upwardly, and some of said notched cross-bars facing downwardly, all extending through a plurality of respectively registered apertures in a plurality of said I-beams, the shoulders thereon engaging in the overhang of the I-beams, fixing said I-beams longitudinally side by side in generally parallel relationship one to another; and
(e) said dowels secured substantially perpendicular to the I-beams through the apertures therethrough, the key slot in the dowels receiving the second portions of the cross-bars, the interengaging shoulder and overhang and the keyed dowel cooperating to prevent rotation of the dowel in the apertures and tilting of the I-beams.

58. A grating comprising, in combination:
(a) a plurality of elongate I-beams each having a plurality of apertures therein, the respective apertures in said I-beams being in registry, the I-beams being comprised of a first portion of a greater width and a second portion of lesser width under the upper portion, forming an overhang between first and second portions of the I-beam;
(b) a plurality of notched cross-bars having a first portion and a second portion, having a plurality of notches, the notches being in registry, said first and second portions forming a shoulder therebetween, said first portion further having a skid-resistant segment formed on the upper surface thereof;
(c) a plurality of dowels having a diameter substantially the diameter of the apertures in the I-beams having a key slot formed longitudinally therein substantially equal to the width of the lower portion of the cross-bars;
(d) some of said notched cross-bars facing upwardly, and some of said notched cross-bars facing downwardly, all extending through a plurality of respectively registered apertures in a plurality of said I-beams, the skid resistant segment extending beyond the plane of the surfaces of the I-beams, fixing said I-beams longitudinally side by side in generally parallel relationship one to another; and
(e) said dowels secured substantially perpendicular to the I-beams through the apertures therethrough, the key slot in the dowels receiving the second portions of the cross-bars, the skid-resistant segments of the cross-bars forming a skid resistant surface on the grating, and supporting the grating above a supporting surface, the shoulder and overhang cooperating with the dowel key slot to prevent rotation of the dowel.

59. The grating comprising, in combination:
(a) a plurality of elongate I-beams each having a plurality of apertures therein, the respective apertures in said I-beams being in registry, the I-beams being comprised of a first portion of a greater width and a second portion of lesser width under the upper portion, forming an overhang between first and second portions of the I-beam;
(b) a plurality of resilient notched cross-bars having a first portion and a second portion, having a plurality of notches, the notches therein being in registry, said cross-bar first and second portions forming a shoulder therebetween;
(c) a plurality of resilient dowels having a diameter substantially the diameter of the apertures in the I-beams and having a key slot formed longitudinally therein substantially equal to the width of the lower portion of the cross-bars;
(d) said notched cross-bars extending through a plurality of respectively registered apertures in a plurality of said I-beams, fixing said I-beams longitudinally side by side in generally parallel relationship one to another; and
(e) said dowels secured substantially perpendicular to the I-beams through the apertures therethrough, the key slot in the dowels receiving the second portions of the cross-bars, the shoulder and overhang cooperating with the dowel key slot to prevent rotation of the dowel.

60. A grating comprising, in combination:

(a) a plurality of elongate I-beams each having a plurality of apertures therein, the respective apertures in said I-beams being in registry, the I-beams being comprised of a first portion of a greater width and a second portion of lesser width under the upper portion, forming an overhang between first and second portions of the I-beam;

(b) a plurality of resilient notched cross-bars having a first portion and a second portion, having a plurality of notches, the notches therein being in registry, said cross-bar first and second portions forming a shoulder therebetween.

(c) a plurality of dowels having a diameter substantially the diameter of the apertures in the I-beams and having a key slot formed longitudinally therein substantially equal to the width of the lower portion of the cross-bars;

(d) some of said notched cross-bars facing upwardly, and some of said notched cross-bars facing downwardly, all extending through a plurality of respectively registered apertures in a plurality of said I-beams, the skid-resistant segment extending beyond the plane of the surfaces of the I-beams, fixing said I-beams longitudinally side by side in generally parallel relationship one to another; and (e) said dowels secured substantially perpendicular to the I-beams through the apertures therethrough, the key slot in the dowels receiving the second portions of the cross-bars, the skid resistant segments of the cross-bars forming a skid resistant surface on the grating, and supporting the grating above a supporting surface, the shoulder and overhang cooperating with the dowel key slot to prevent rotation of the dowel.

61. A grating comprising:

(a) a plurality of elongate I-beams, each having a plurality of apertures therein, the respective apertures in said I-beams being in registry, the I-beams being comprised of the first portion of greater width, and a second portion of lesser width, the greater and lesser width portions forming an overhang therebetween;

(b) a plurality of notched cross-bars having a first portion and second portion, said cross-bar first portion having a width substantially the same as the width of said I-beam at said apertures, said cross-bar second portion having a width substantially different than the width of said cross-bar first portion, said cross-bar first and second portions forming a shoulder therebetween;

(c) a plurality of dowels having a diameter substantially the diameter of the apertures in the I-beams and having a key slot formed longitudinally therein, substantially equal to the width of the second portion of the cross-bar;

(d) the said notched cross-bars extending through a plurality of respectively registered apertures in a plurality of said I-beams, said shoulders thereon engaging in the overhang of the I-beams, so as to fix said I-beams, longitudinally side-by-side in generally parallel relationship one to another; and (e) said dowels secured substantially perpendicular to the length and height of the I-beams through the apertures therethrough, the key slot in the dowels receiving the lower portions of the cross-bars, the interengaging shoulder and overhang and the key dowel cooperating to prevent rotation of the dowel in the apertures.

62. The grating as recited in claim 61 wherein said I-beam first portion forms an upper portion of said I-beam.

63. The grating as recited in claim 62 wherein said aperture is formed through the second portion of the I-beam.

64. The grating as recited in claim 61 wherein said cross-bar second portion is wider than said cross-bar first portion.

65. The grating as recited in claim 64 wherein said cross-bar second portion is substantially the same width as said I-beam first portion.

* * * * *